US005254841A

United States Patent [19]

Watabe et al.

[11] Patent Number: 5,254,841

[45] Date of Patent: Oct. 19, 1993

[54] METHOD AND APPARATUS FOR PREVENTING BILLS OR THE LIKE FROM BEING PULLED OUT

[75] Inventors: Masayuki Watabe, Moroyama; Yoshinori Maruyama, Kawagoe, both of Japan

[73] Assignee: Nippon Conlux Co., Ltd., Tokyo, Japan

[21] Appl. No.: 727,414

[22] Filed: Jul. 9, 1991

[30] Foreign Application Priority Data

Jul. 12, 1990 [JP] Japan ................................ 2-184849
Aug. 2, 1990 [JP] Japan ................................ 2-205764

[51] Int. Cl.[5] ................................ G06F 15/30

[52] U.S. Cl. ................................ 235/379; 902/12; 902/13; 902/14

[58] Field of Search ................................ 902/12, 13, 14; 235/379

[56] References Cited

U.S. PATENT DOCUMENTS 4,355,711 10/1982 Hirose ................................ 902/13
4,494,743 1/1985 Kushmaul ................................ 902/13
4,501,416 2/1985 Hain ................................ 902/13

*Primary Examiner*—Harold Pitts
*Attorney, Agent, or Firm*—Spensley Horn Jubas & Lubitz

[57] ABSTRACT

It is judged whether or not a bill, inserted from a bill inlet, is genuine, and then the bill is passed to a bill stacking position through a bill passage only when it is judged that the bill is genuine. The bill is pushed into an accumulating box by rotating an eccentric cam of a stacker unit at the bill stacking position when the a shutter switch becomes on after the bill passes a shutter plate and a pull out preventing lever. The eccentric cam is held at a top dead center. A bill pull out preventing apparatus includes a pull out preventing lever having a distal end portion. The distal end portion is curved to define a hook groove. The lever is arranged so that the distal end portion is directed away from the insert slot. The lever is spring biased to swing about a pivot to block the bill passage.

4 Claims, 7 Drawing Sheets

METHOD AND APPARATUS FOR PREVENTING BILLS OR THE LIKE FROM BEING PULLED OUT

BACKGROUND OF THE INVENTION

1. Field of the Invention

The present invention relates to a method and apparatus for preventing a bill or the like from being pulled out, and more particularly relates to a method and apparatus for preventing a bill or the like from being pulled out by an illegal act from a bill processing machine such as automatic vending machine and money exchanger. In this specification and claims, the term "bill" is referred to a paper money and the like valuable sheet material.

2. The Prior Art

Generally, such a money processing machine is provided with a bill or paper money discriminating unit and a bill accumulating unit. The discriminating unit discriminates an inserted genuine bill from a counterfeit one, and the bill accumulating unit accumulates only genuine bills accepted in a bill accumulating box. Bills are conveyed by means of conveyor belts or the like from an inlet slot along a bill passage to the bill accumulating box. During this transportation, it is judged by the bill discriminating unit whether or not the bill inserted is genuine or counterfeit. Conventionally, a shutter plate is provided to block the bill passage for the purpose of preventing a genuine bill, which has passed the discriminating unit, from being drawn back to the bill inlet slot by an illegal act.

However, in the bill processing machine according to the conventional method, the shutter plate may be manually retreated by inserting an elongated thin plastic plate into the bill passage through the bill inlet slot. Thus, there is a problem in that bills accepted in the bill processing machine are liable to be illegally drawn back in such a manner.

SUMMARY OF THE INVENTION

Accordingly, it is an object of the present invention to provide a method of preventing bills from being pulled out, in which method when a thin plastic plate is inserted from a bill inlet slot along a bill passage, the bills are pushed in an accumulating box by driving a stack motor, whereby bills are prevented from being pulled out.

Another object of the present invention is to provide an apparatus of preventing bills from being pulled out, in which the bills are prevented from being pulled out by inserting a thin plastic plate from a bill inlet slot along a bill passage.

To accomplish these and other objects, the present invention provides a method of preventing bills from being pulled out, the improvement which comprises the steps of: judging whether or not a bill, inserted from a bill inlet, is genuine; passing the bill to a bill stacking position through a bill passage only when it is judged that the bill is genuine; pushing the bill at the bill stacking position into an accumulating box by rotating an eccentric cam of a stacker unit when a shutter switch becomes on after the bill passes a shutter plate and a pull out preventing lever; and then holding the eccentric cam at a top dead center.

Thus, according to the present invention, the genuine bill may be transported to the bill stacking position through the bill passage; then the genuine bill is pushed into the accumulating box by rotating the eccentric cam of the stacker unit when the shutter switch becomes on by manually retreating the shutter plate; and then the eccentric cam may be held at the top dead center.

In a preferred mode of the present invention, it is judged whether or not a bill, inserted from a bill inlet, is genuine; the genuine bill is passed to a bill stacking position through a bill passage only when it is judged that the bill is genuine; the genuine bill at the bill stacking position is pushed into an accumulating box by rotating an eccentric cam of a stacker unit after the genuine bill passes a pull out preventing lever; and after the genuine bill pushing step, a genuine bill signal is outputted.

According to this preferred mode, a genuine bill signal is outputted after the genuine bill passes a pull out preventing lever. Thus, if an illegal user tries to draw back the stacked bill toward the bill inlet slot, such a pull out act is prevented by engaging the bill with the pull out preventing lever.

In an apparatus for preventing a bill from being pulled out according to the present invention, there are provided: a pull out preventing lever including a distal end portion, the distal end portion being curved to define a hook groove, the lever being arranged so that the distal end portion is directed away from a bill insert slot; supporting means for pivotally supporting the lever so that the lever may block the bill passage by pivoting; and biasing means for spring biasing the lever to block the bill passage.

According to this aspect of the present invention, the pull out preventing lever is spring biased to block the bill passage. A genuine bill, having a tape attached, which has been received in an accumulating box, is brought into engagement with the hook groove of the distal end of the pull out preventing lever if it is tried to draw back the bill by inserting a thin plastic plate into the bill passage. Thus, the illegal pull out act of bills is positively prevented.

BRIEF DESCRIPTION OF THE DRAWINGS

In the drawings.

.

DETAINED DESCRIPTION OF THE PREFERRED EMBODIMENT

Figure 1:
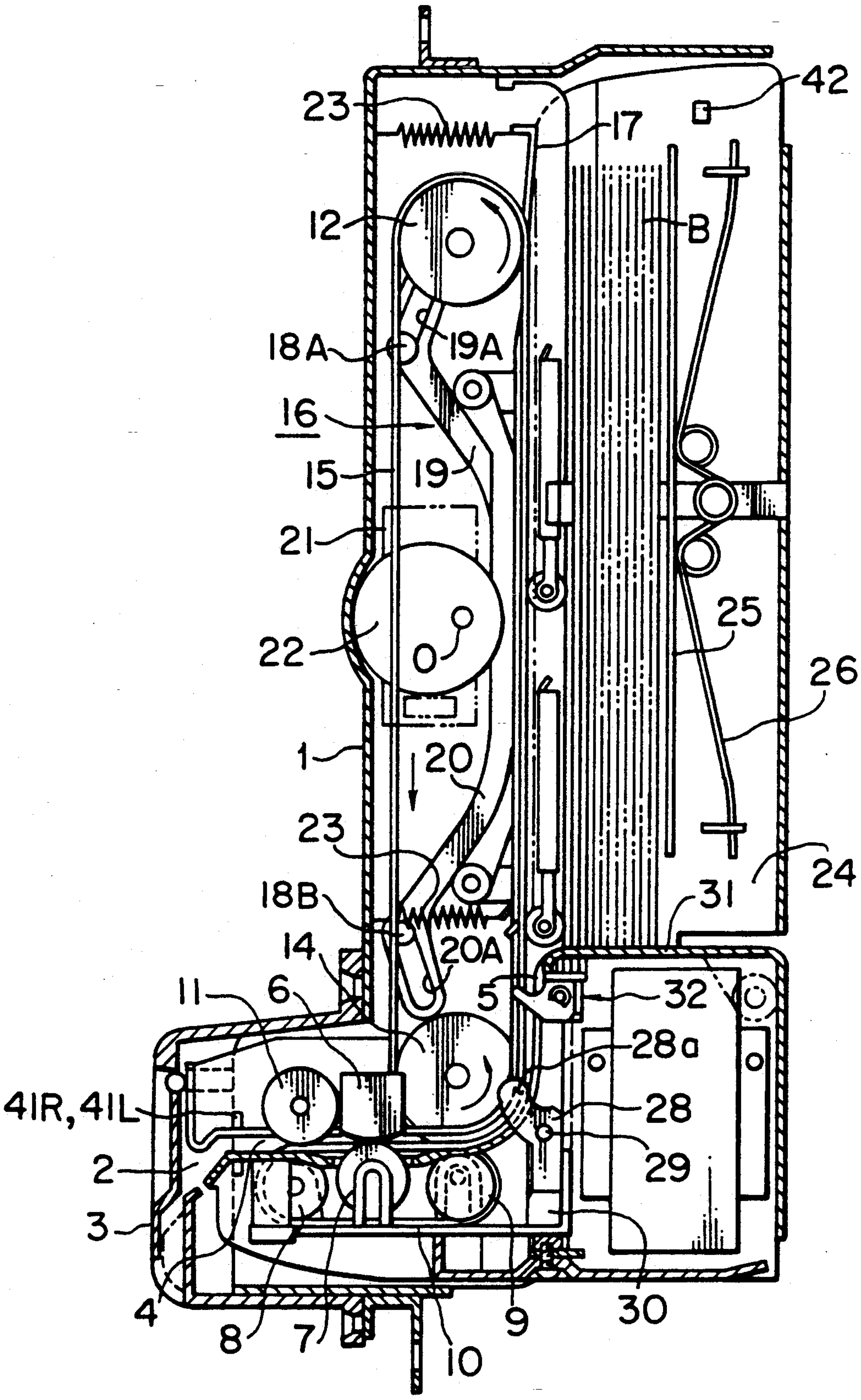
FIG. 1 is a vertical sectional view of one embodiment of a bill processing apparatus to which the present invention is applied.

FIG. 1 is a vertical section of one embodiment of a bill processing system to which the present invention is applied. The bill processing system includes a housing 1, which has a bill insertion slot 2 formed through the front wall thereof. A bill is allowed to be inserted into the bill insertion slot 2 when a cover 3 is swung upwards. Within the housing 1 there are provided a horizontal bill passage 4 and a vertical bill passage 5 which communicates to the horizontal bill passage 4 in an L shape. The horizontal bill passage 4 and the vertical bill passage 5 are formed to communicate to the bill insertion slot 2. As means for discriminating genuine bills from counterfeit bills a magnetic head 6 is arranged on the upper side of the horizontal bill passage 4. A head pinch roller 7 is arranged to oppositely face the magnetic head 6. Pulleys 8 and 9 are disposed in front of and behind the pinch roller 7, respectively. A belt 10 extends in a parallel fashion between and around the pulleys 8 and 9. A conveying motor 51 (FIG. 10 ) is connected to the pulley 9 for rotating the pulleys 8 and 9. A pinch roller 11 presses the pulley 8 through the belt 10.

Figure 10:
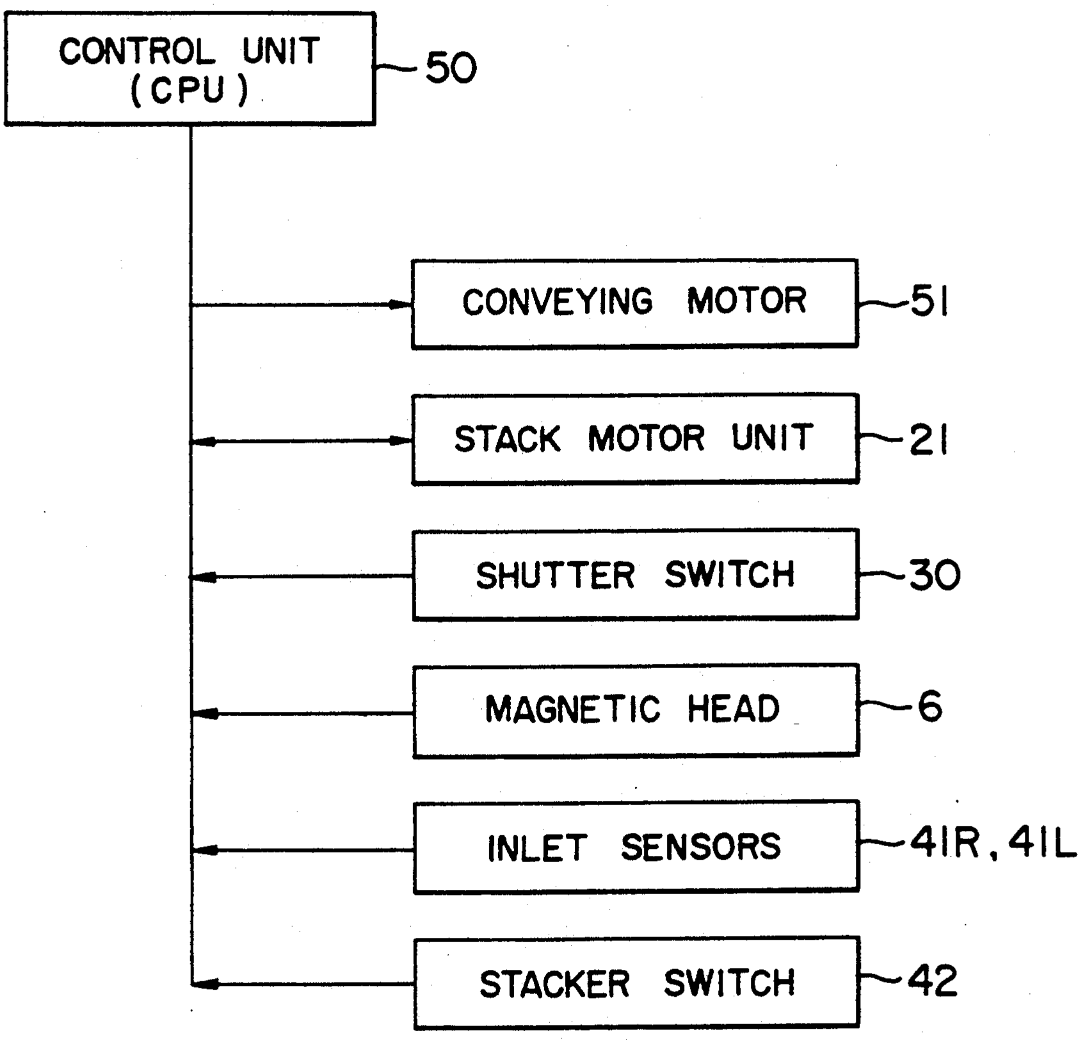
FIG. 10 is a block diagram of a control system of the apparatus of FIG. 1.

On one side or front side of the vertical bill passage 5, there are provided a pair of drive pulleys 12 and 12 at a horizontal distance although only one drive pulley 12 is shown. The drive pulleys 12 and 12 are rotated by a conveying motor 5]. (FIG. 10). A pair of driven pulleys 14 and 14 are arranged at a lower portion of the housing 1 to correspond to the drive pulleys 12 and 12, respectively, and thereby two pairs of drive pulleys 12 and driven pulleys 14 are provided. A receiving belt 15 extends in a parallel manner between and around each pair of the drive pulley 12 and the driven pulley 14. Adjacent to the receiving belt 15 there is provided a bill stacker unit 16, which includes a pushing plate 17, a pair of links 19 and 20, and an eccentric cam 22. The pushing plate 17 is adapted to push backwardly a bill B which has been conveyed along the vertical bill passage 5 to a stacking position. Each of the links 19 and 20 is pivotally attached at its one end to the front surface of the pushing plate 17, and is slidably mounted at the other end to a fixed shaft 18A, 18B which passes through a slot 19A, 20A form through the link. The eccentric cam 22 is mounted on an output shaft (not shown) of a stack motor unit 21 to rotate around a rotation center 0. The pushing plate 17 is spring biased toward the bill stacker unit 16 by a pair of coil springs 23 and 23. On the other side of the vertical bill passage 5, there is provided an accumulating box 24 which accumulates bills B urged toward it by the bill stacker unit 16. A compressing plate 25 is arranged within the accumulating box 24 and is urged forwardly or to the left in FIG. 1 by a spring bar 26.

Figure 2:
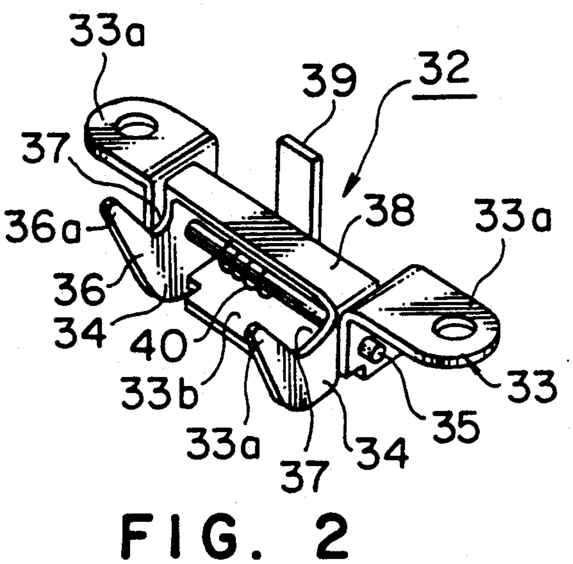
FIG. 2 is an enlarged perspective view of the pull out preventing unit in FIG. 1.

In the connected area between the horizontal bill passage 4 and the vertical bill passage 5 there is provided a shutter plate 28, which is pivotally mounted to the housing 1 through a pivot 29. The shutter plate 28 is spring biased in the counterclockwise direction in FIG. 1, and normally closes or blocks the vertical bill passage 5 at its distal end 28*a* as shown. Thus, the shutter plate 28 is rotated in the clockwise direction by a bill B, which is being transported to the accumulating box 24 in a bill receiving direction, so that the shutter plate 28 is automatically retracted away from vertical bill passage 5. This causes a shutter switch 30 to be turned on. On the other hand, the shutter plate 28 serves as a stopper to a bill B which is moving in the opposite direction or toward the bill insertion slot 2. The accumulating box 24 is provided with a bottom plate 31. A pull out preventing unit 32 is arranged below the bottom plate 31, and as shown in FIG. 2 includes a bracket 33, a pull out preventing lever 34, and a pivotal shaft 35 pivotally connecting the pull out preventing lever 34 to the bracket 33. The bracket 33 includes a pair of lugs 33*a* and 33*a* and a channel-shaped bracket body 33*b* which opens upwardly, the bracket body integrally formed with the lugs 33*a* and 33*a*. The pull out preventing lever 34 has a pair of pawls 36 and 36 which are integrally connected through a connecting plate 38. Each of the pawls 36 extends diagonally upwards to define a hook groove 37 in the upper edge thereof. The pull out preventing lever 34 is arranged so that the pawls 36 and 36 extend away from the bill insertion slot 2. The connecting plate 38 has a tongue 39 integrally and vertically formed with the center thereof. The tongue 39 effectively prevents lower edges of bills received in the accumulating box 24 from suspending into the vertical bill passage 5.

Figure 3:
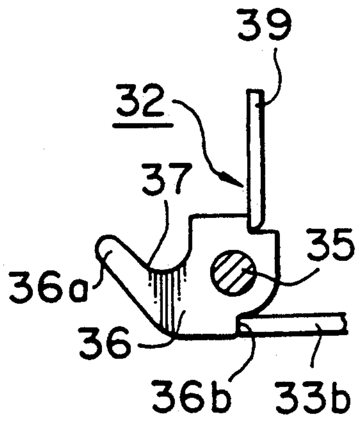
FIG. 3 is a side elevational view of the pull out preventing lever of FIG. 2.

As clearly shown in FIG. 3, each of the pawls 36 and 36 has a stopper surface 36*b* formed in the lower edge thereof. The pull out preventing lever 34 is supported for pivotal movement about the pivotal shaft 35. A coil spring 40 is mounted around the pivotal shaft 35 so that the coil spring 40 spring biases the pull out preventing lever 34 around the pivotal shaft 35 to block the vertical bill passage 5 by the pawls 36 and 36.

Further in FIG. 1, inlet sensors 41R and 41L are arranged just behind the bill insertion slot 2 to detect a bill inserted. The reference numeral 42 designates a stacker switch which detects whether or not the accumulating box 24 is set in position.

The bill pull out preventing apparatus is provided with a control unit 50, which includes a conventional central processing unit (CPU) and a read only memory (ROM) with a control program stored in it.

Figure 4:
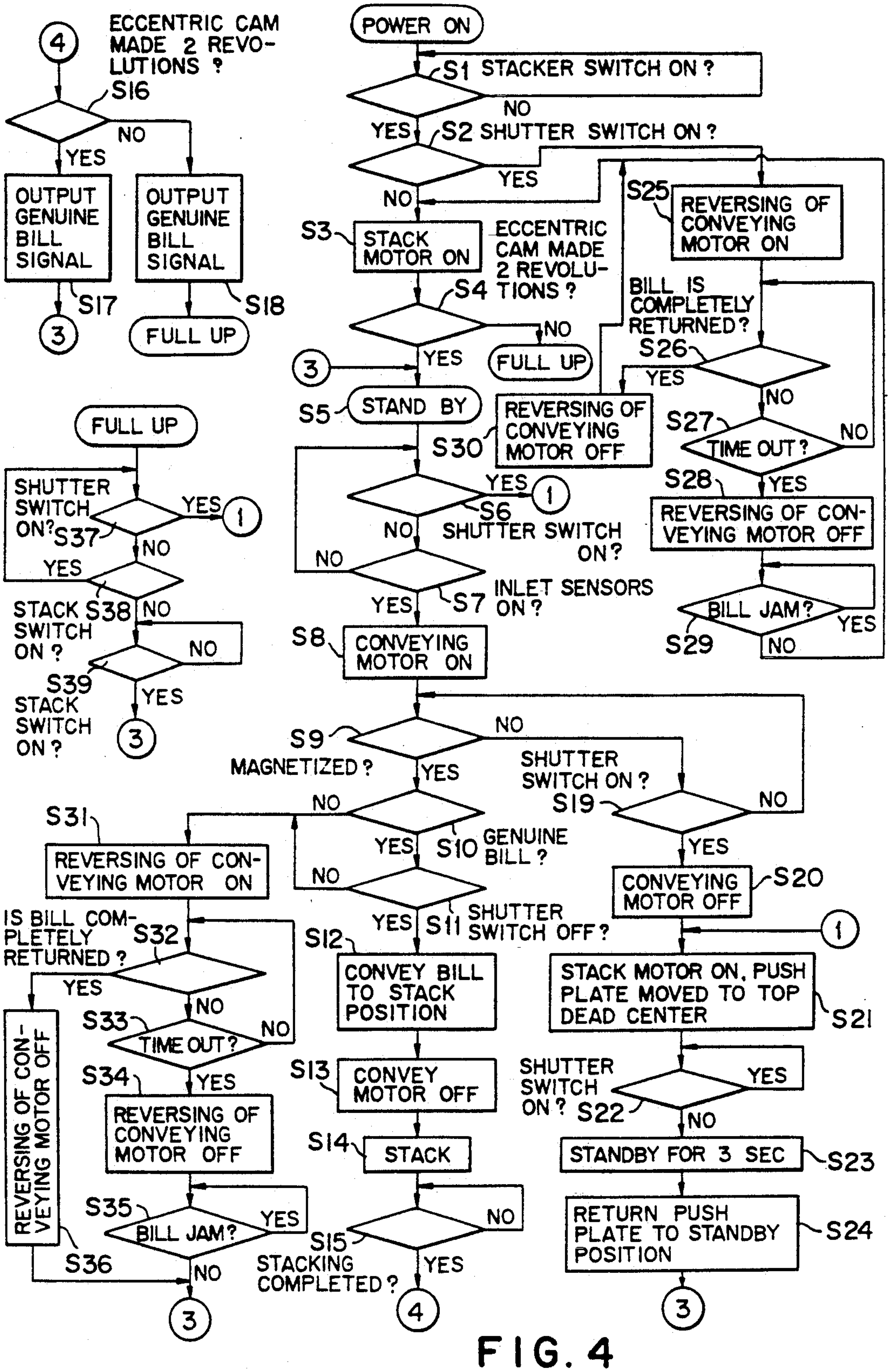
FIG. 4 is a flow chart illustrating a bill pull out preventing method of the present invention.

Now, referring to FIG. 4, the routine of preventing bills from being pulled out will be illustrated.

Firstly, when the stacker switch 42 is on (step S1) and the shutter switch 30 is off (step S2) after the power is turned on, according to the program of the ROM the CPU instructs the stack motor unit 21 to be energized (step S3). The CPU is placed in a standby state after the eccentric cam 22 made two revolutions (steps S4 and S5). When in the step S4 the eccentric cam 22 does not makes two revolutions, it is presumed that the accumulating box 24 is full up. Thus, necessary steps, such as bill receipt prohibition, are executed. In the step S4 it is judged whether or not the accumulating box 24 is full up of bills when the power is turned on. Although it is possible to push and accumulate bills in the accumulating box 24 by one revolution of the eccentric cam 22, in this embodiment the eccentric cam 22 is made two revolutions to positively place bills in the accumulating box 24. These revolutions are detected by a signal from the stack motor unit 21. When the shutter switch 30 is on in the step S2, it is liable that a bill is still left in the bill passage within the discriminating unit. In this event, the CPU controls that the conveying motors 51 is reversed (step S25) to return the remaining bill to the bill insertion slot 2. When the bill is completely placed back to the bill insertion slot 2, the inlet sensors 41R and 41L send signals to the CPU, and then the CPU stops reversing of the motors (step S30), and thus the CPU is returned to the step S3. When the bill is not returned, the check of the step S26 is repeated for about 3 second (steps S26 and S27). After lapse of 3 second, the reversing of the conveying motors is stopped (step S28). After the stopping of the motor, the CPU judges whether or not there is a jam of a bill or bills (step S29). This judgement is repeated until the jam is removed, and when the jam is removed, the CPU returns to the step S3.

When in the standby state, the shutter switch 30 is not on (step S6), the CPU goes to the step S7, where it is judged based on signals sent from the inlet sensors 41R and 41L whether or not the inlet sensors 41R and 41L are tuned on. When a bill B is inserted into the bill insertion slot 2, the inlet sensors 41R and 41L detect this and turn on, and then the conveying motors 51 is energized to introduce the inserted bill B into the bill passages 4 and 5 by the belts 10 and 15 (step S8).

Figure 5:
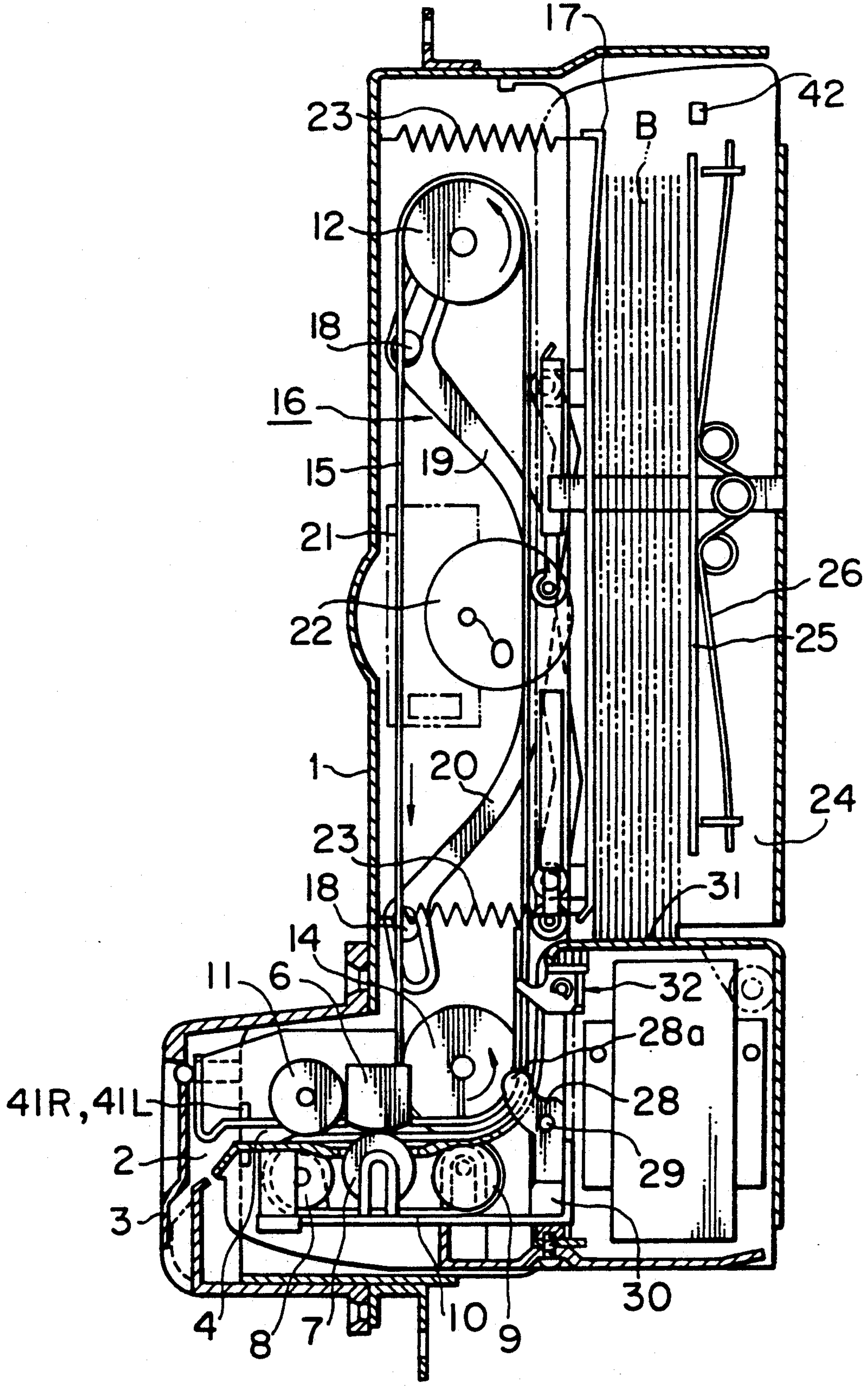
FIG. 5 is a vertical sectional view of the bill processing apparatus of FIG. 1, in which the eccentric cam is held at the top dead center.
Figure 7:
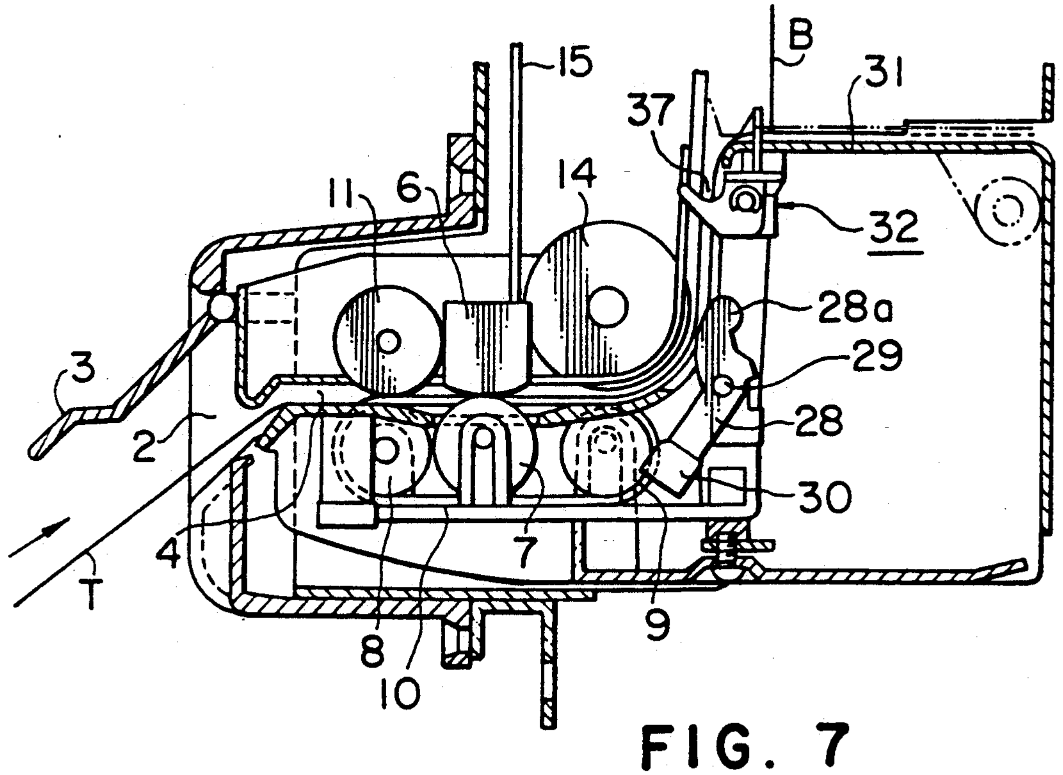
FIG. 7 is a vertical sectional view of the bill processing apparatus of FIG. 6, in which the bill with a tape is stacked.

When the shutter switch 30 is turned on in the step S6, it is presumed that an illegal action was taken, and the CPU enters a routine 1 and goes to the step S21. In the step S21, the CPU energizes the stack motor 21 to rotate the eccentric cam 22 to the top dead center and thereby the pushing plate 17 is raised to the top dead center position (FIG. 5). When the shutter switch 30 is still on, the pushing plate 17 is kept urging the accumulated bills of the accumulating box 24 in the top dead center state against the compressing plate 25 which is spring biased to the left in FIG. 5 by the spring bar 26.

When the illegal action is stopped, the shutter plate 28 causes the shutter switch 30 to be turned off, and thus the CPU goes from the step S22 to the step S23. After about three seconds, in the step S24 the CPU energizes stack motor 21 to rotate the eccentric cam 22 so as to return the pushing plate 17 to the standby state with the eccentric cam 22 placed at the bottom dead center (FIG. 1). Thus, the CPU returns to the standby state in the step 5 of the routine 3.

The illegal action is conducted by the following procedures: a genuine bill having a tape attached to its one end is inserted to the bill processing machine; the bill is stacked in the accumulating box 24 in the routine of steps S7 to S17; and then it is tried to draw back the bill by pulling the tape. More specifically, to retract the shutter plate 28 from the bill passage, a thin plastic plate or the like plate is inserted through the bill inlet slot 2 to push the shutter plate (the shutter switch 30 is turned on). In this state, it is tried to draw back the bill by pulling the tape.

According to the present invention, after the step S5, the CPU receives a signal representing that the shutter switch 30 is on or off, and when the shutter switch 30 is on, the CPU executes procedures of steps S20 to S24. The stacked genuine bill with the tape is urged by the pushing plate 17 to the top dead center position due to the rotation of the eccentric cam 22, and hence it is not possible to draw back the bill.

Returning to illustration of the normal route after the conveying motors are energized in the step S8, it is detected by the magnetic head 6 whether or not the bill is magnetized when the leading end of the bill reaches the magnetic head 6. When the bill is magnetized, according to a signal from the magnetic head 6 the CUP judges for the first stage that the bill is genuine (step S9), and then the bill is transported further to reach the shutter switch 30. The bill turns and keeps the shutter switch 30 on, during which the CPU judges whether or not the bill has a magnetic pattern of the genuine bill (step S10). When in this step an affirmative result is obtained, the bill is transported to and stopped at the stack position (steps S12 and S13) after the bill passes the shutter plate 28 causing the shutter switch 30 to be turn off.

When in the step S10 it is judged that the bill is not genuine, the conveying motors are reversed to return the bill to the bill insertion slot 2 as in the steps S25 to S30 (steps S31 to S36).

On the other hand, after the conveying motors are stopped in the step S13, the CPU energizes the stack motor unit 21 to rotate the eccentric cam 22, and thereby the bill is stacked (step S14). When the eccentric cam 22 makes two revolutions after the stack operation (steps S15 and S16), the CPU outputs a genuine bill signal (step S17), and returns to the standby state. In the case where in the step S16 it is detected that the eccentric cam 22 did not make two revolutions, the CPU judges that the accumulating box 24 is full up, and takes necessary steps such as prohibition of receiving of bills.

When in the step S9 the magnetic head 6 outputs a signal representing that the bill is not magnetized, it is likely that a nonmagnetic plastic plate or the like is inserted into the bill passage for illegally pulling out a bank. Furthermore, when the shutter switch 30 is turned on, that is, when the shutter switch 30 is turned on by a nonmagnetic insert (step S19), the CPU stops the conveying motor (step S20). Subsequently, the CPU energizes the stack motor unit 21 to rotate the eccentric cam 22, thereby urging the pushing plate 17 to the top dead center position toward the accumulating box 24 (step S21).

Until the shutter switch 30 is turned off, this state is held (step S22). When the shutter switch 30 is turned off, that is, when the insert is drawn out, a negative result is obtained in the step S22, and then after about 3 second (step S23), in the step S24 the CPU controls the stack motor 21 to rotate the eccentric cam to return the pushing plate 17 to the normal standby position (as shown in FIG. 1).

There is a possibility that when the accumulating box 24 is full of bills, a thin plastic plate or the like is illegally inserted form the bill insertion slot 2 into the bill passage 4. For example, the accumulating box 24 may become full up when a genuine bill having a tape attached to it is inserted. In this event, to pull out the bill the bill passage may be released by retracting the distal end 28*a* of the shutter plate 28 with the inserted thin plate. This causes the shutter switch 30 to turn on, and the CPU goes to the step S21, and then as already described the stack motor unit 21 is energized to rotate the eccentric cam 22, and thereby the pushing plate 17 is pushed into the accumulating box 24, and is held in this position. When the shutter switch 30 is off in the step S37, on the basis of a signal sent from the stacker switch 42 the CPU makes a judgement as to whether or not the stacker switch 42 is on or off (step S38). When the stacker switch 42 is off, the accumulating box 24 is removed and the bills stacked in it are taken out. Then, the accumulating box 24 is set in position again. After receipt of a signal representing that the stacker switch is on (step S39), the CPU returns to the standby state (step S5).

Referring to FIGS. 6 to 9, it will be described how the bill pull out preventing apparatus prevents pulling out of a bill by an illegal action such that a genuine bill B with a tape T attached to its trailing end is accepted and then it is tried to draw back the bill.

Figure 6:
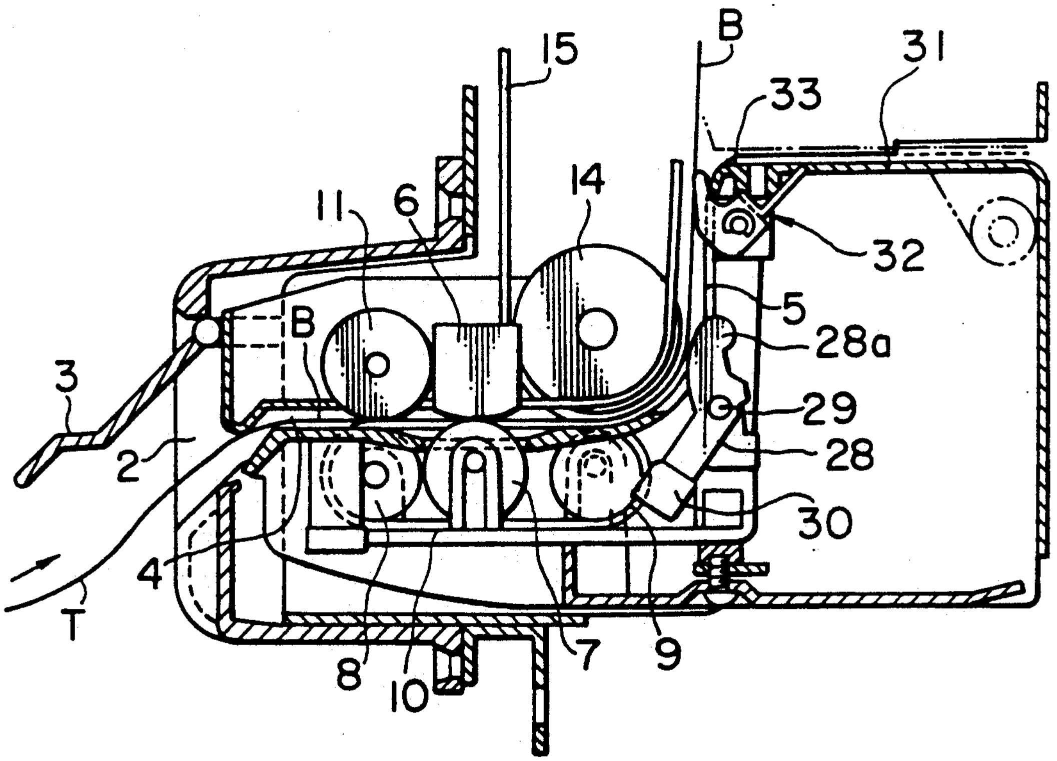
FIG. 6 is an enlarged fragmental vertical sectional view of the bill processing apparatus of FIG. 1, in which a bill with a tape is inserted.

In FIG. 6, the genuine bill B with the tape T is inserted into the bill passage 4 through the bill inlet slot 2 as in the usual case, and the magnetic head 6 sends a signal representing the bill B is genuine. Subsequently, the bill B is conveyed in the bill passage 4, pushing the distal end 28*a* of the shutter plate 28 outside the bill passage 4, and then the bill B pushes the pull out lever 34 to retract against the spring force of the coil spring 40, and is thus introduced into the bill passage 5. When the bill B reaches to the stack position where it faces the pushing plate 17, the conveying of the bill B is stopped, and the eccentric cam 22 makes two revolutions, so that the pushing plate 17 makes two reciprocal movements. The pushing plate 17 pushes the bill B into the accumulating box 24 against the compressing plate 25. Although the pushing plate 17 may make a single reciprocal movement by a revolution of the eccentric cam 22, it is preferable to make the pushing plate two reciprocal movements as in this embodiment to positively accumulate bills.

Figure 8:
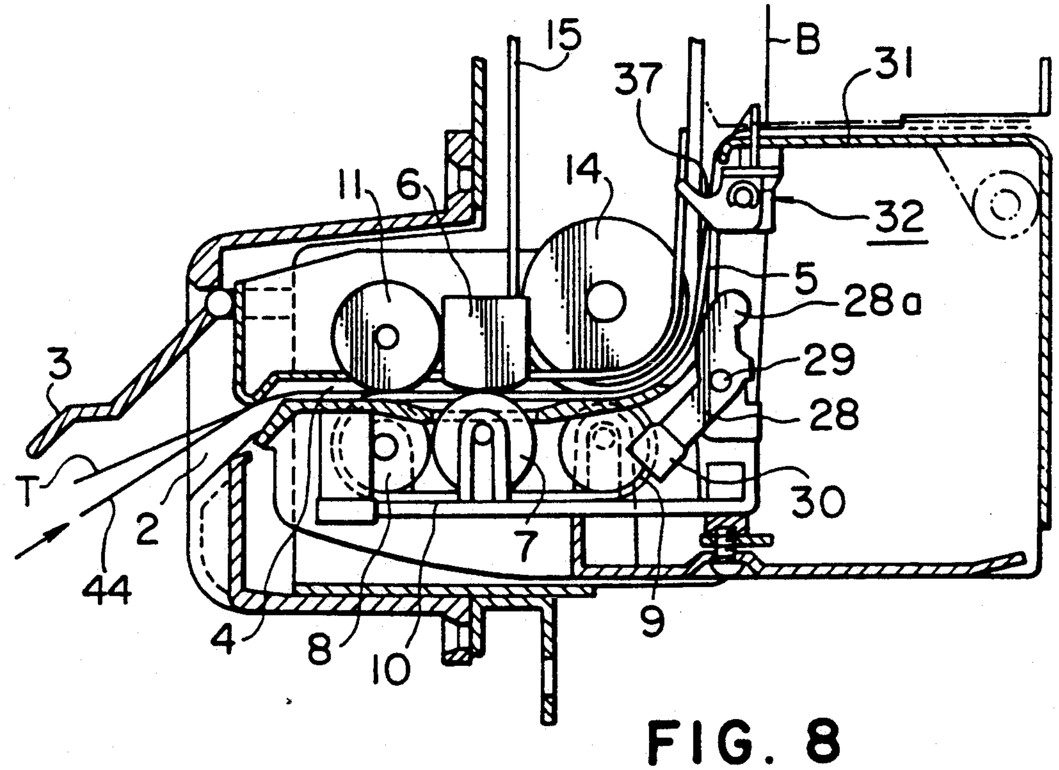
FIG. 8 is a vertical sectional view of the bill processing apparatus of FIG. 6, in which a plastic plate is inserted.
Figure 9:
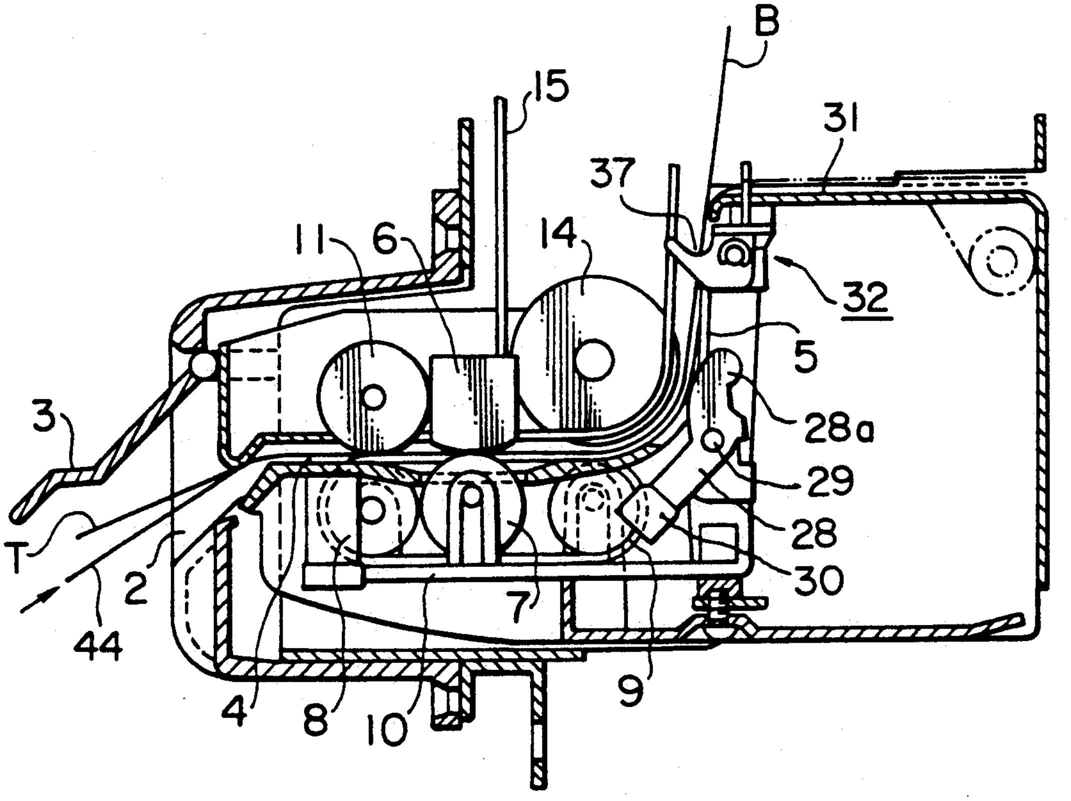
FIG. 9 is a vertical sectional view of the bill processing apparatus of FIG. 6, in which the bill is being drawn back.

In the case where as shown in FIG. 8 it is tried to pull out the bill B by moving the distal end 28*a* of the shutter plate 28 away from the bill passage with a plastic plate 44 which has been inserted through the bill inlet slot 2, the lower end of the bill B is brought into engagement with the hook grooves 37 of the pull out preventing levers 34 and 34, and thereby pulling out of the bill B is prevented.

In the case where an illegal user inserts the plastic plate 44 further and tries to draw out the bill B by pressing the pawls 36*a* of the pull out preventing unit 32, the tongue 39 serves to push the front bill B backward or toward the back of the accumulating box 24, and the bills B are hence prevented from being pulled out. Thus, the tongue 39 effectively serves to prevent such an illegal act to pull out bills as well as prevents bills from suspending.

What is claimed is

1. In a method of preventing bills from being pulled out of a bill processing machine, the improvement which comprises the steps of:

judging whether or not a bill, inserted through a bill inlet, is genuine;

passing the bill to a bill stacking position through a bill passage only when it is judged that the bill is genuine;

pushing the genuine bill at the bill stacking position into an accumulating box by rotating an eccentric cam of a stacker unit when a shutter switch is turned on after the genuine bill passes a shutter plate and a pull out preventing lever; and then, holding the eccentric cam at a top dead center position thereof.

2. A method as recited in claim 1, wherein the condition under which the shutter switch is turned on includes one of both a state in which the accumulating box is not full and another state in which the accumulating box is full of bills.

3. In a method of preventing bills form being pulled out of a bill processing machine, the improvement which comprises the steps of:

judging whether or not a bill, inserted through a bill inlet, is genuine;

passing only a bill judged to be genuine to a bill stacking position through a bill passage;

pushing the genuine bill a the bill stacking position into an accumulating box by rotating an eccentric cam of a stacker unit after the genuine bill passes a pull out preventing lever; and after the genuine bill pushing step, outputting a genuine bill signal.

4. In an apparatus for preventing a bill from being pulled out of a bill processing machine, in which a bill inserted through an insert slot in the machine is judged as to whether or not it is genuine, and only a genuine bill is passed to a bill accumulating box in the machine through a bill passage in the machine, the improvement which comprises preventing means, arranged in the bill passage, for preventing a bill from being passed to the bill accumulating box, the preventing means including:

a pull out preventing lever including a distal end portion, the distal end portion being curved to define a hook groove, the lever being arranged so that the distal end portion is directed away form the insert slot;

supporting means for pivotally supporting the lever so that the lever may block the bill passage by pivoting; and biasing means for spring biasing the lever into a position to block the bill passage.

* * * * *